US012659103B2

(12) United States Patent
Myung et al.

(10) Patent No.: US 12,659,103 B2
(45) Date of Patent: Jun. 16, 2026

(54) METHOD FOR TRANSMITTING OR RECEIVING UPLINK SIGNAL OR DOWNLINK SIGNAL AND DEVICE THEREFOR

(71) Applicant: LG Electronics Inc., Seoul (KR)

(72) Inventors: Sechang Myung, Seoul (KR); Suckchel Yang, Seoul (KR); Seonwook Kim, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 18/549,530

(22) PCT Filed: Apr. 19, 2023

(86) PCT No.: PCT/KR2023/005304
§ 371 (c)(1),
(2) Date: Sep. 7, 2023

(87) PCT Pub. No.: WO2023/211046
PCT Pub. Date: Nov. 2, 2023

(65) Prior Publication Data
US 2025/0023680 A1 Jan. 16, 2025

Related U.S. Application Data

(60) Provisional application No. 63/422,512, filed on Nov. 4, 2022, provisional application No. 63/335,710, filed on Apr. 27, 2022.

(51) Int. Cl.
*H04W 4/00* (2018.01)
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
None
See application file for complete search history.

(56) References Cited

U.S. PATENT DOCUMENTS 11,751,194 B2 * 9/2023 Shin .......................... H04L 5/001
370/329
2020/0287675 A1 9/2020 Zhang et al.
(Continued)

FOREIGN PATENT DOCUMENTS

KR 10-2019-0138895 12/2019
WO WO 2021/159510 8/2021
(Continued)

OTHER PUBLICATIONS

International Search Report and Written Opinion in Appln. No. PCT/KR2023/005304, mailed on Jul. 26, 2023, 11 pages (with English translation).
(Continued)

*Primary Examiner* — Zewdu A Beyen
(74) *Attorney, Agent, or Firm* — Fish & Richardson P.C.

(57) ABSTRACT

A method of transmitting an uplink (UL) signal or receiving a downlink (DL) signal by a user equipment (UE) in a wireless communication system is disclosed. The method includes receiving first information related to a bandwidth part (BWP), receiving second information related to an available resource block (RB) set among a plurality of RB sets included in the BWP, transmitting the UL signal through at least one RB included in the available RB set based on the BWP being a UL BWP, and receiving the DL signal through at least one RB included in the available RB set based on the BWP being a DL BWP.

20 Claims, 9 Drawing Sheets

(56)     References Cited

U.S. PATENT DOCUMENTS

2021/0258968 A1     8/2021   Wei et al.
2022/0046642 A1     2/2022   Lin
2023/0156478 A1*    5/2023   Liao ..................... H04L 5/0064
                                                          370/329

FOREIGN PATENT DOCUMENTS

WO          2021/171053  A1     9/2021
WO     WO 2022/014833           1/2022

OTHER PUBLICATIONS

MediaTek Inc., "Discussion on Rel-18 network energy savings,"
3GPP TSG RAN WG1 #108-e, R1-2202071, e-Meeting, Feb.
21-Mar. 3, 2022, 11 pages.
Extended European Search Report in European Appln. No. 23761420.
1, mailed on Feb. 25, 2026, 11 pages.

* cited by examiner

FIG. 9

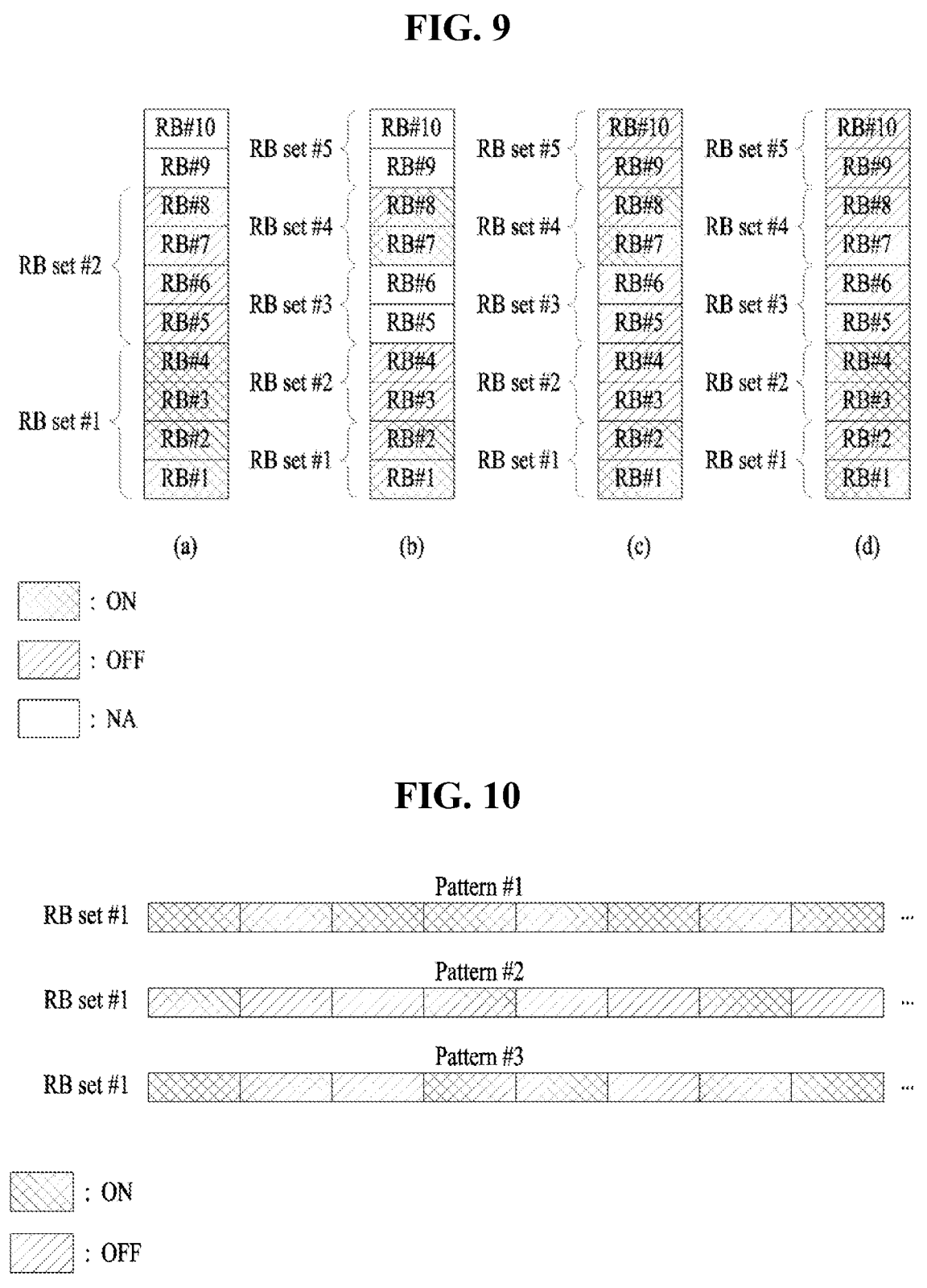

| RB set #2 { RB set #1 { | | RB set #5<br>RB set #4<br>RB set #3<br>RB set #2<br>RB set #1 | | RB set #5<br>RB set #4<br>RB set #3<br>RB set #2<br>RB set #1 | | RB set #5<br>RB set #4<br>RB set #3<br>RB set #2<br>RB set #1 | | RB set #5<br>RB set #4<br>RB set #3<br>RB set #2<br>RB set #1 |

RB#10
RB#9
RB#8
RB#7
RB#6
RB#5
RB#4
RB#3
RB#2
RB#1

(a)          (b)          (c)          (d)

▨ : ON

▧ : OFF

Pattern #1

RB set #1

Pattern #2

RB set #1

Pattern #3

RB set #1

▨ : ON

▧ : OFF

METHOD FOR TRANSMITTING OR RECEIVING UPLINK SIGNAL OR DOWNLINK SIGNAL AND DEVICE THEREFOR

CROSS-REFERENCE TO RELATED APPLICATIONS

This application is a National Stage application under 35 U.S.C. § 371 of International Application No. PCT/KR2023/ 005304, filed on Apr. 19, 2023, which claims the benefit of U.S. Provisional Application No. 63/422,512, filed on Nov. 4, 2022, and 63/335,710, filed on Apr. 27, 2022. The disclosures of the prior applications are incorporated by reference in their entirety.

TECHNICAL FIELD

The present disclosure relates to a method of transmitting and receiving an uplink signal or a downlink signal and an apparatus therefor, and more particularly, to a method of performing uplink/downlink transmission and reception through a resource block (RB) set configured to be available among a plurality of RB sets in a bandwidth part (BWP) and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving an uplink (UL) signal or a downlink (DL) signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of transmitting an uplink (UL) signal or receiving a downlink (DL) signal by a user equipment (UE)

in a wireless communication system, including receiving first information related to a bandwidth part (BWP), receiving second information related to an available resource block (RB) set among a plurality of RB sets included in the BWP, transmitting the UL signal through at least one RB included in the available RB set based on the BWP being a UL BWP, and receiving the DL signal through at least one RB included in the available RB set based on the BWP being a DL BWP.

The second information may be related to whether each of the plurality of RB sets is available.

Each of the plurality of RB sets may be configured as one of available, not available, and unknown, and the second information may be related to whether an RB set configured as unknown is available.

The available RB set may be available during a timer duration known by the second information.

The second information may be related to a pattern regarding a slot that the available RB set is available.

A DL signal of a first type may be received or a UL signal of a second type may be transmitted through an RB set other than the available RB set.

In another aspect of the present disclosure, provided herein is a user equipment (UE) for transmitting an uplink (UL) signal or receiving a downlink (DL) signal in a wireless communication system, including at least one transceiver; at least one processor; and at least one memory operably connected to the at least one processor and configured to store instructions that, when executed, cause the at least one processor to perform operations. The operations may include receiving, through the at least one transceiver, first information related to a bandwidth part (BWP), receiving, through the at least one transceiver, second information related to an available resource block (RB) set among a plurality of RB sets included in the BWP, transmitting, through the at least one transceiver, the UL signal through at least one RB included in the available RB set based on the BWP being a UL BWP, and receiving, through the at least one transceiver, the DL signal through at least one RB included in the available RB set based on the BWP being a DL BWP.

The second information may be related to whether each of the plurality of RB sets is available.

Each of the plurality of RB sets may be configured as one of available, not available, and unknown, and the second information may be related to whether an RB set configured as unknown is available.

The available RB set may be available during a timer duration known by the second information.

The second information may be related to a pattern regarding a slot that the available RB set is available.

A DL signal of a first type may be received or a UL signal of a second type may be transmitted through an RB set other than the available RB set.

In another aspect of the present disclosure, provided herein is a method of receiving an uplink (UL) signal or transmitting a downlink (DL) signal by a base station (BS) in a wireless communication system, including transmitting first information related to a bandwidth part (BWP), transmitting second information related to an available resource block (RB) set among a plurality of RB sets included in the BWP, receiving the UL signal through at least one RB included in the available RB set based on the BWP being a UL BWP, and transmitting the DL signal through at least one RB included in the available RB set based on the BWP being a DL BWP.

In another aspect of the present disclosure, provided herein is a base station (BS) for receiving an uplink (UL) signal or transmitting a downlink (DL) signal in a wireless communication system, including at least one transceiver; at least one processor; and at least one memory operably connected to the at least one processor and configured to store instructions that, when executed, cause the at least one processor to perform operations. The operations may include transmitting, through the at least one transceiver, first information related to a bandwidth part (BWP), transmitting, through the at least one transceiver, second information related to an available resource block (RB) set among a plurality of RB sets included in the BWP, receiving, through the at least one transceiver, the UL signal through at least one RB included in the available RB set based on the BWP being a UL BWP, and transmitting, through the at least one transceiver, the DL signal through at least one RB included in the available RB set based on the BWP being a DL BWP.

In another aspect of the present disclosure, provided herein is a computer-readable storage medium including at least one computer program that causes at least one processor to perform operations. The operations may include receiving first information related to a bandwidth part (BWP), receiving second information related to an available resource block (RB) set among a plurality of RB sets included in the BWP, transmitting the UL signal through at least one RB included in the available RB set based on the BWP being a UL BWP, and receiving the DL signal through at least one RB included in the available RB set based on the BWP being a DL BWP.

In another aspect of the present disclosure, provided herein is an apparatus for transmitting an uplink (UL) signal or receiving a downlink (DL) signal in a wireless communication system, including at least one processor; and at least one memory operably connected to the at least one processor and configured to store instructions that, when executed, cause the at least one processor to perform operations. The operations may include receiving first information related to a bandwidth part (BWP), receiving second information related to an available resource block (RB) set among a plurality of RB sets included in the BWP, transmitting the UL signal through at least one RB included in the available RB set based on the BWP being a UL BWP, and receiving the DL signal through at least one RB included in the available RB set based on the BWP being a DL BWP.

Advantageous Effects

According to the present disclosure, a BS defines a plurality of RB sets or a plurality of RB set groups in a BWP and dynamically adjusts the amount of frequency resources used to transmit a specific DL/UL signal and channel by turning ON/OFF at least one RB set or at least one RB set group or indicating ON/OFF patterns of a plurality of RB sets or a plurality of RB set groups, through a medium access control (MAC)-control element (CE) or (group-common) downlink control information (DCI), thereby obtaining an effect of reduction in power consumption of a UE and the BS.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 9 and 10 are diagrams for explaining an ON/OFF method of an RB set or an RB set group according to an embodiment of the present disclosure;

DETAILED DESCRIPTION

Figure 1:
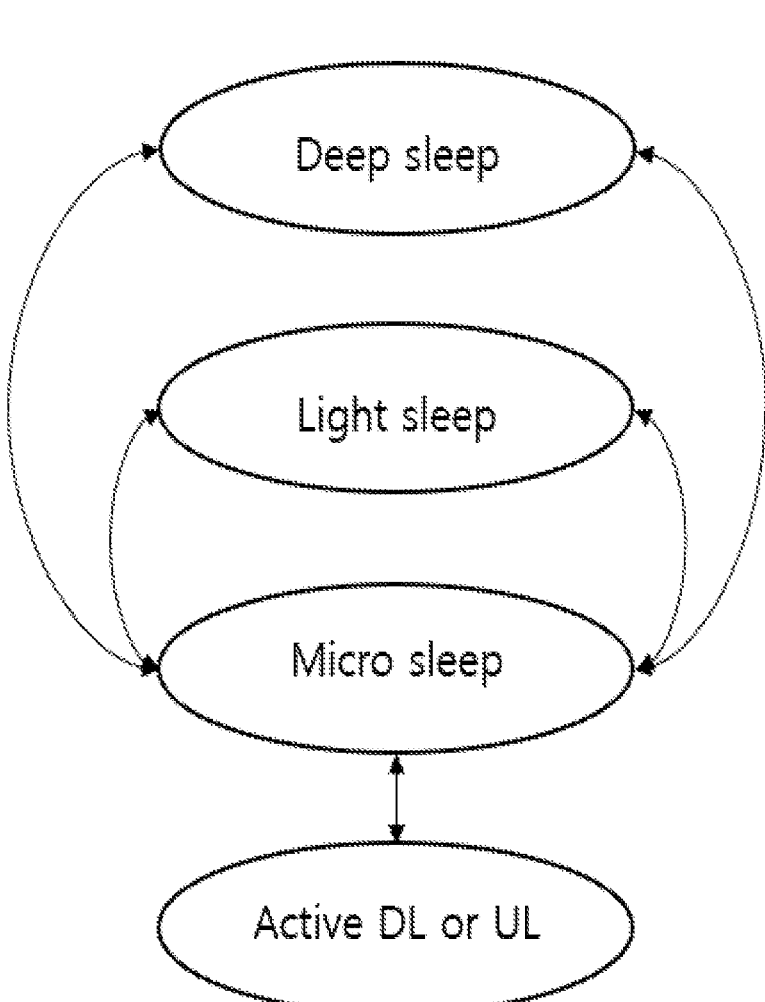
FIG. 1 is a diagram for explaining network energy savings.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 is a diagram for explaining network energy savings (NES) according to the present disclosure.

As compared with the LTE system, the NR system is reported to use, by an NR base station (BS), 3 to 4 times higher than power consumed by an LTE BS due to more dense installation of BSs and use of more antennas/bandwidths/frequency bands. In order to solve the problem of increasing operating costs of business operators and build an eco-friendly network, a study item that discusses methods for reducing energy consumption of a BS has been approved.

3GPP radio access network working group 1 (RAN WG1) has defined an energy consumption model and simulation methodology of the BS in order to show that energy consumption gain is obtainable by applying NES technology. Specifically, as illustrated in FIG. 1, a sleep state of the BS (i.e., a state in which the BS does not perform both transmission and reception) and an active state of the BS (i.e., a state in which the BS performs transmission and/or reception) are defined, and a transition method in each state has been determined. In addition, a relative power value consumed by the BS in each state and time and energy required for state transition have been modeled.

Techniques discussed in 3GPP RAN WG1 for NES may be broadly divided into techniques in four domains (i.e., time/frequency/spatial/power domains), and specific techniques in each domain may be summarized as in Table 1.

TABLE 1

| | Time domain techniques |
|---|---|
| A-1 | Adaptation of common signals and channels |
| A-2 | Dynamic adaptation of UE specific signals and channels |
| A-3 | Wake up of gNB triggered by UE wake up signal |
| A-4 | Adaptation of DTX/DRX |
| A-5 | Adaptation of SSB/SIB1 |
| | Frequency domain techniques |
| B-1 | Multi-carrier energy savings enhancements |
| B-2 | Dynamic adaptation of bandwidth part of UE(s) within a carrier |
| B-3 | Dynamic adaptation of bandwidth of active BWP |
| | Spatial domain techniques |
| C-1 | Dynamic adaptation of spatial elements |
| C-2 | TRP muting/adaptation in multi-TRP operation |
| | Power domain techniques |
| D-1 | Adaptation of transmission power of signals and channels |
| D-2 | Enhancements to assist gNB digital pre-distortion |
| D-3 | Adaptation of transceiver processing algorithm |
| D-4 | PA backoff adaptation |
| D-5 | UE post-distortion |

As NES techniques in the time domain, methods have been discussed of turning on or off a UE-common signal (e.g., a synchronization signal block (SSB), a system information block (SIB), or paging) or a UE-specific signal (e.g., a channel state information-reference signal (CSI-RS)) as in A-1, A-2, and/or A-5 of Table 1, transmitting, by a UE, a wake-up signal for waking up the BS of an inactive state as in A-3 of Table 1, or controlling transmission and reception of a user equipment (UE) according to a discontinuous transmission (DTX)/discontinuous reception (DRX) pattern as in A-4 of Table 1.

As NES techniques in the frequency domain, methods have been discussed of an SCell operating without a synchronization signal block (SSB) in an inter-band carrier aggregation (CA) situation as in B-1 of Table 1, or switching a bandwidth part (BWP) or adjusting the bandwidth of the BWP, as in B-2 and/or B-3 of Table 1.

As NES techniques in the spatial domain, methods haven been discussed of supporting an operation of turning on or off each antenna port of the BS or each transmission and reception point (TRP) as in C-1 and/or C-2 of Table 1 and improving associated CSI measurement and report.

As NES techniques in the power domain, methods have been discussed of dynamically changing the power of a downlink signal (e.g., an SSB, a CSI-RS, or a physical downlink shared channel (PDSCH)) as in D-1 of Table 1 or applying a digital distortion compensation method or a tone reservation scheme of the BS/UE as in D-2, D-3, D-4, and/or D-5 of Table 1, thereby maximizing power amplifier (PA) efficiency and increasing transmission efficiency.

Techniques discussed in 3GPP PAN WG2 for NES, except for techniques (e.g., A-4, A-5, and B-1) commonly discussed in 3GPP RAN WG1 and 3GPP RAN WG2, include a method for NES-capable UEs or existing NR UEs to access an NES cell, and an efficient handover method for UEs accessing the NES cell.

As a result of the RAN #98-e meeting, NES work items were approved, and discussion topics for each leading WG are as follows. A RAN WG1 leading item includes a method of supporting an operation of turning on/off an antenna port of the BS or dynamically changing a power offset between a PDSCH and a CSI-RS, and improving associated CSI measurement and report (e.g. C-1 and D-1). A RAN WG2 leading item includes a method of controlling transmission and reception of the UE (e.g., A-4) according to a DTX/DRX pattern of the BS, a method of preventing existing NR UEs from accessing the NES-cell, and a conditional handover (CHO) method considering a source or target cell which is in operation of NES. In addition, a RAN WG3 leading item includes a method of exchanging information about an active beam between nodes and a paging method through a limited area. A RAN WG4 leading item includes an SCell (e.g., B-1) operating without an SSB in an inter-band CA situation.

Figure 2:
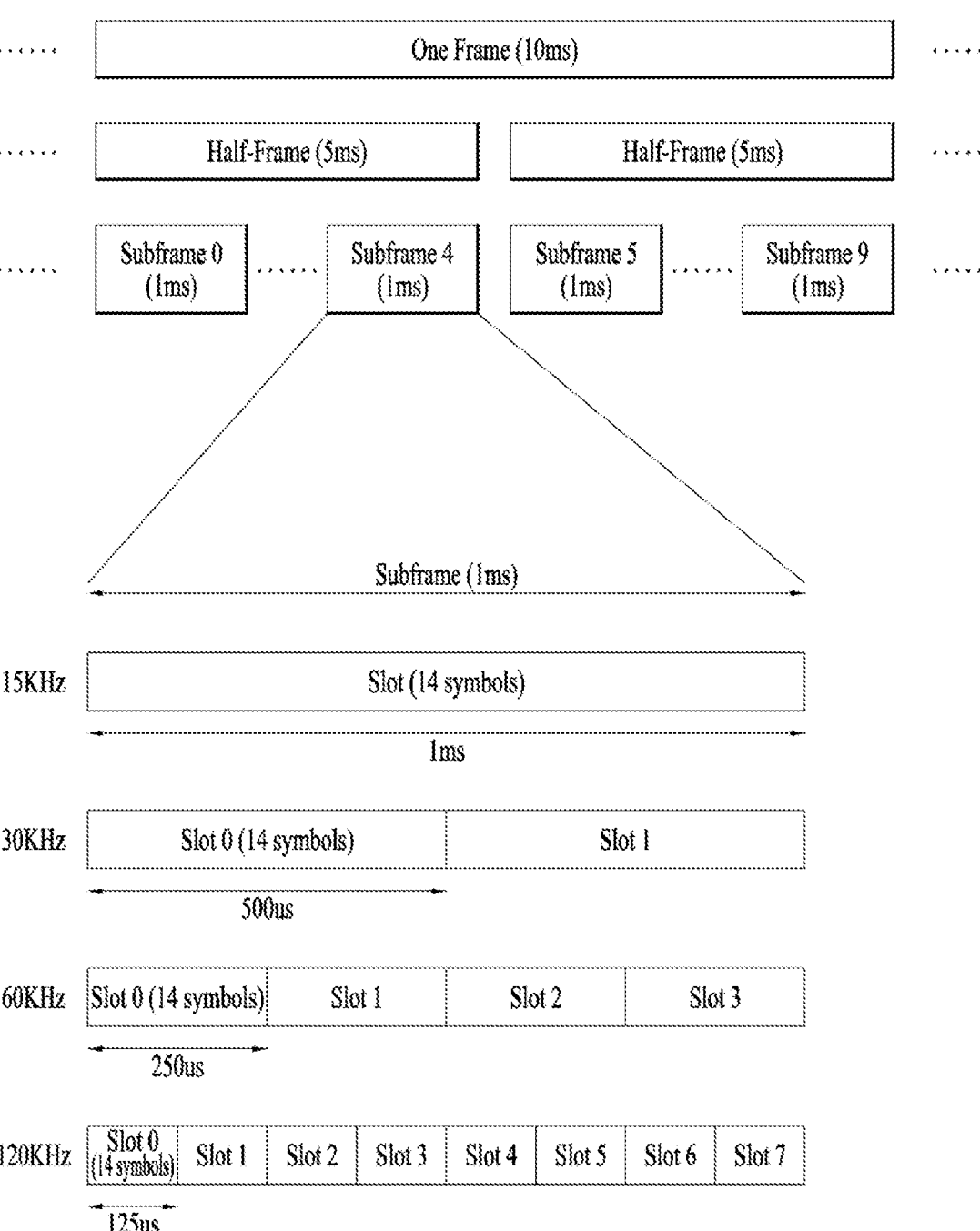
FIG. 2 illustrates a radio frame structure.

FIG. 2 illustrates a radio frame structure.

In NR, UL and DL transmissions are configured in frames. Each radio frame has a length of 10 ms and is divided into two 5-ms half-frames. Each half-frame is divided into five 1-ms subframes.—A subframe is divided into one or more slots, and the number of slots in a subframe depends on a subcarrier spacing (SCS). Each slot includes 12 or 14 OFDM (A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 2 exemplarily illustrates that the number of symbols per slot, the number of slots per frame, and the number of slots per subframe vary according to SCSs in a normal CP case.

TABLE 2

| SCS ($15*2^u$) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*Nslotsymb: number of symbols in a slot*Nframe, uslot: number of slots in a frame

*Nsubframe,uslot: number of slots in a subframe

Table 3 illustrates that the number of symbols per slot, the number of slots per frame, and the number of slots per subframe vary according to SCSs in an extended CP case.

TABLE 3

| SCS (15*2^u) | Nslotsymb | Nframe, uslot | Nsubframe, uslot |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM (A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 4

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
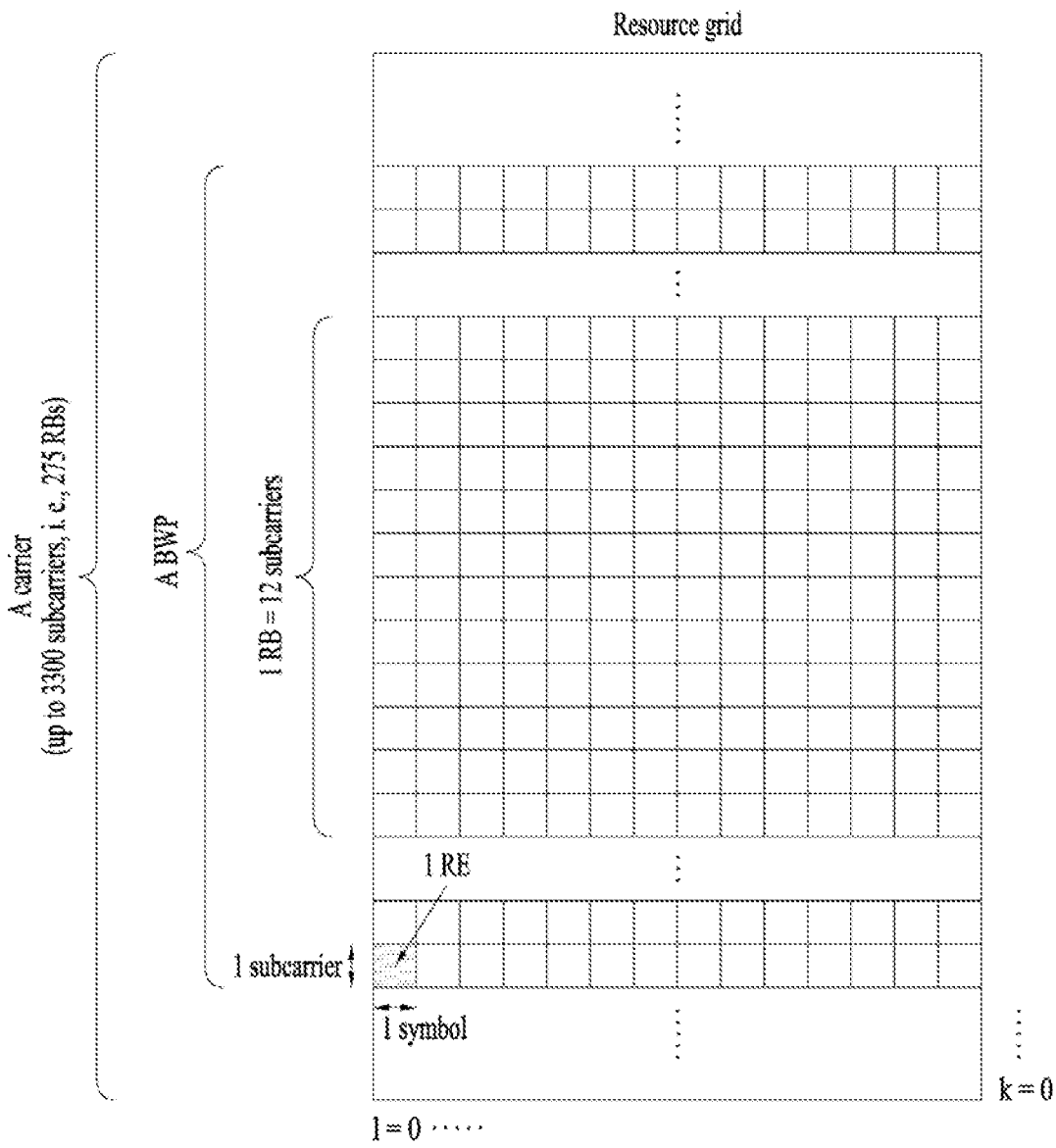
FIG. 3 illustrates a resource grid during the duration of a slot.

FIG. 3 illustrates a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Bandwidth Part (BWP)

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

Figure 4:
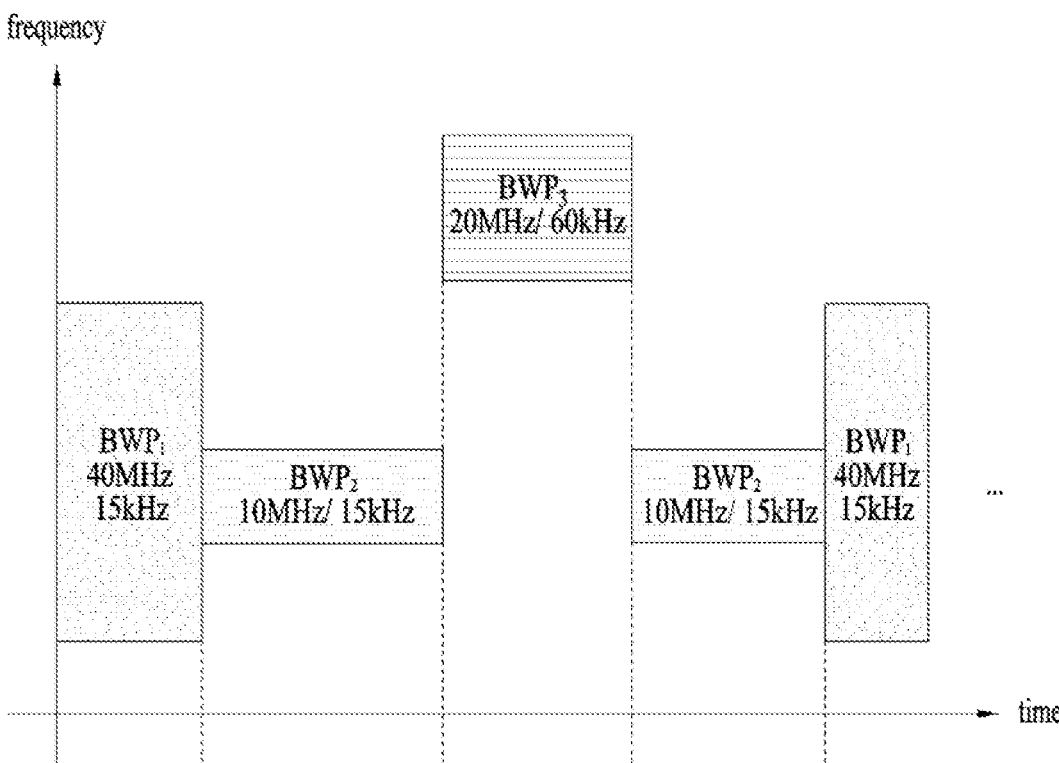
FIG. 4 illustrates the structure of a bandwidth part (BWP)

Referring to FIG. 4, the BS may configure multiple BWPs in one CC configured for the UE. For example, the BS may configure a BWP occupying a relatively small frequency area in a PDCCH monitoring slot, and schedule a PDSCH indicated (or scheduled) by a PDCCH in a larger BWP. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells.

In FIG. 4, BWP1 is set to a bandwidth of 40 MHz with an SCS of 15 kHz, BWP2 is set to a bandwidth of 10 MHz with an SCS of 15 kHz, and BWP3 is set to a bandwidth of 20 MHz with an SCS of 60 kHz.

The BS may configure at least one DL/UL BWP for a UE associated with the wideband CC, activate at least one of DL/UL BWP(s) configured at a specific time point (by L1 signaling (e.g., DCI), MAC signaling, or RRC signaling), and indicate switching to another configured DL/UL BWP (by L1 signaling, MAC signaling, or RRC signaling). Further, upon expiration of a timer value (e.g., a BWP inactivity timer value), the UE may switch to a predetermined DL/UL BWP. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP. Meanwhile, DL signals such as a physical downlink control channel (PDCCH), a physical downlink shared channel (PDSCH), a synchronization signal block (SSB), and a channel state information-reference signal (CSI-RS) may be transmitted and received through an active DL BWP.

In addition, UL signals such as a physical uplink control channel (PUCCH), a physical uplink shared channel (PUSCH), a physical random access channel (PRACH), and a sounding reference signal (SRS) may be transmitted and received through an active UL BWP.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

Figure 5:
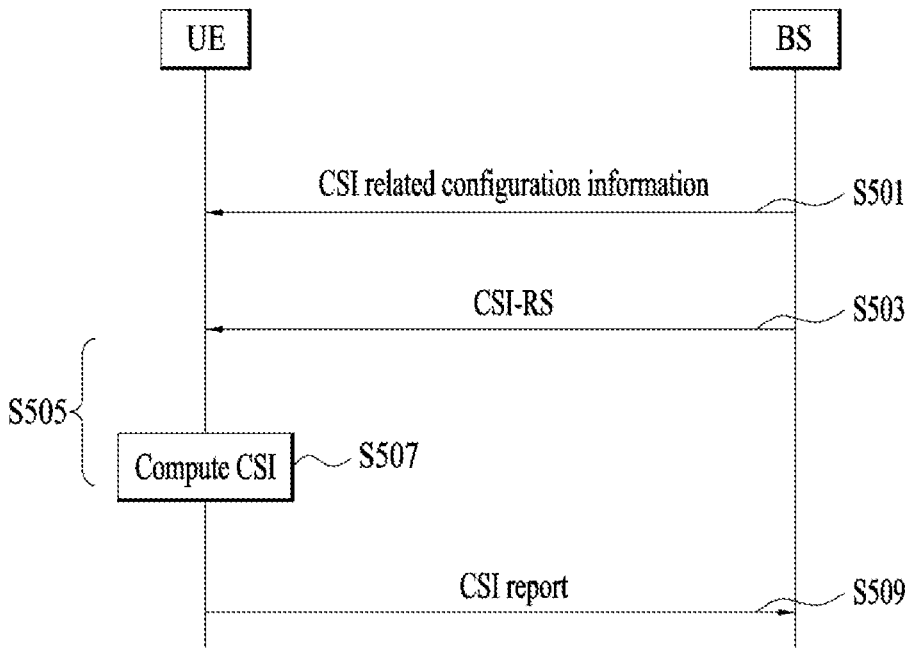
FIG. 5 is a diagram illustrating a signal flow for channel state information (CSI) reporting.

FIG. 5 is a diagram illustrating a signal flow for a CSI-related process.

For one of the above-described uses of the CSI-RS, a UE receives CSI-related configuration information from a BS by RRC signaling (S501).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S505). The CSI measurement may include (1) CSI-RS reception of the UE (S503) and (2) CSI computation in the received CSI-RS (S507). Mapping of the CSI-RS to REs of CSI-RS resources in the time and frequency domains is configured by an RRC parameter, CSI-RS-ResourceMapping.

The UE reports the measured CSI to the BS (S509).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1. 1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1. 2. Resource Setting Configuration

A resource setting may mean a resource set list, and one reporting setting may be linked to up to three resource settings.

When one resource setting is configured, the resource setting (given by an RRC parameter resourcesForChannelMeasurement) is for channel measurement for RSRP computation.

When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1. 3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

Each NZP CSI-RS port configured for interference measurement corresponds to an interference transmission layer.

All interference transmission layers on NZP CSI-RS ports for interference measurement take into account energy per resource element (EPRE) ratios.

The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semiPersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig.

That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

Energy savings of the BS are considered important in a wireless communication system including 3GPP, because the energy savings may contribute to building an eco-friendly network through carbon emission reduction and reducing operational expenditure (OPEX) by communication companies. In particular, since high transmission rate is required due to introduction of 5G communication, BSs need to be equipped with a larger number of antennas and provide services through a wider bandwidth and frequency band. According to a recent study, the energy cost of the BS has reached a level of 20% of the total OPEX. Due to this growing interest in the energy savings of the BS, 3GPP NR release 18 has approved a new study item called "study on network energy savings"

Specifically, the corresponding item considers the following enhancement techniques in order to improve energy saving capabilities in terms of transmission and reception of the BS.

How to apply one or more NES techniques more efficiently for a dynamic and/or semi-static operation and a finer granularity adaptation operation of transmission and/or reception in time, frequency, space, and power domains, based on UE assistance information and potential support/feedback from the UE.

The present disclosure intends to propose an energy saving method of a BS in the frequency domain.

The present disclosure mainly considers a scenario of obtaining NES gain by dynamically adjusting frequency resources on which UL and DL transmission is performed. For example, the BS may adjust the amount of frequency resources on which a PDCCH or a PDSCH is transmitted by turning ON/OFF a specific RB set or a specific RB set group in an active DL/UL BWP or indicating ON/OFF patterns of a plurality of RB sets or a plurality of RB set groups, through a medium access control (MAC)-control element (CE) or (group-common) downlink control information (DCI), thereby obtaining an effect of reduction in power consumption of the UE and the BS and expecting an effect of interference mitigation as well.

In the present disclosure, that the BS is "operating in a power saving mode", "in a state in which the power saving mode is ON", or "operating in an NES mode" may mean that the BS transmits signaling for explicitly indicating/configuring a corresponding operation/state or other related signaling and the UE receives the transmitted signaling. For example, other related signaling may be signaling indicating that some or all resources of the time domain, frequency domain, and/or spatial domain are switched OFF for a certain time period and/or transmission power for a DL signal/channel of the BS is lowered.

Figure 6:
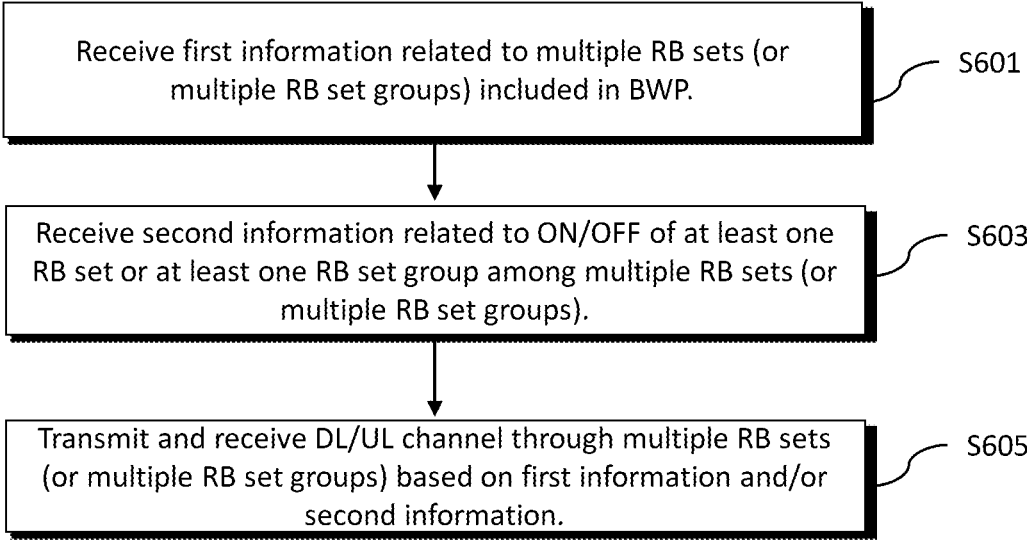
FIGS. 6 to 8 are diagrams for explaining overall operation processes of a UE and a BS according to an embodiment of the present disclosure.
Figure 7:
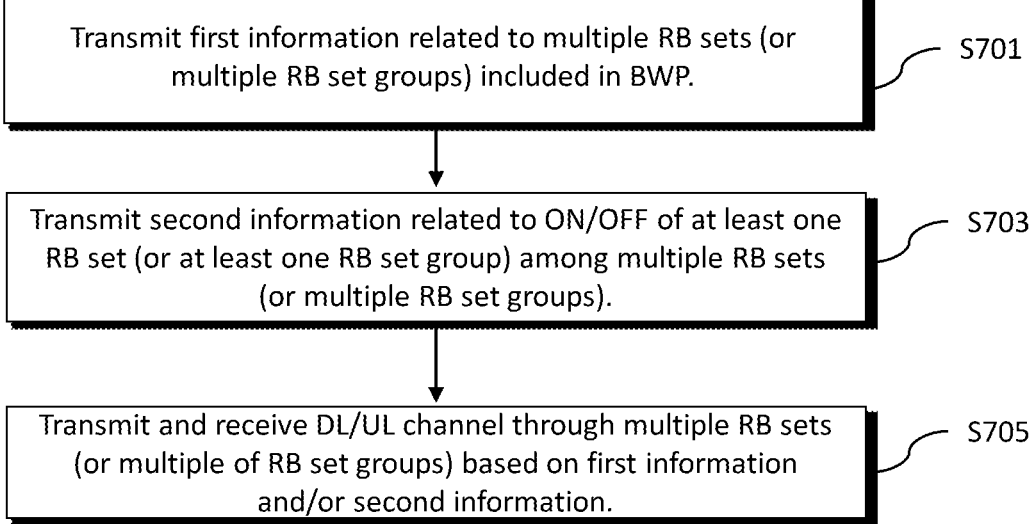
Figure 8:
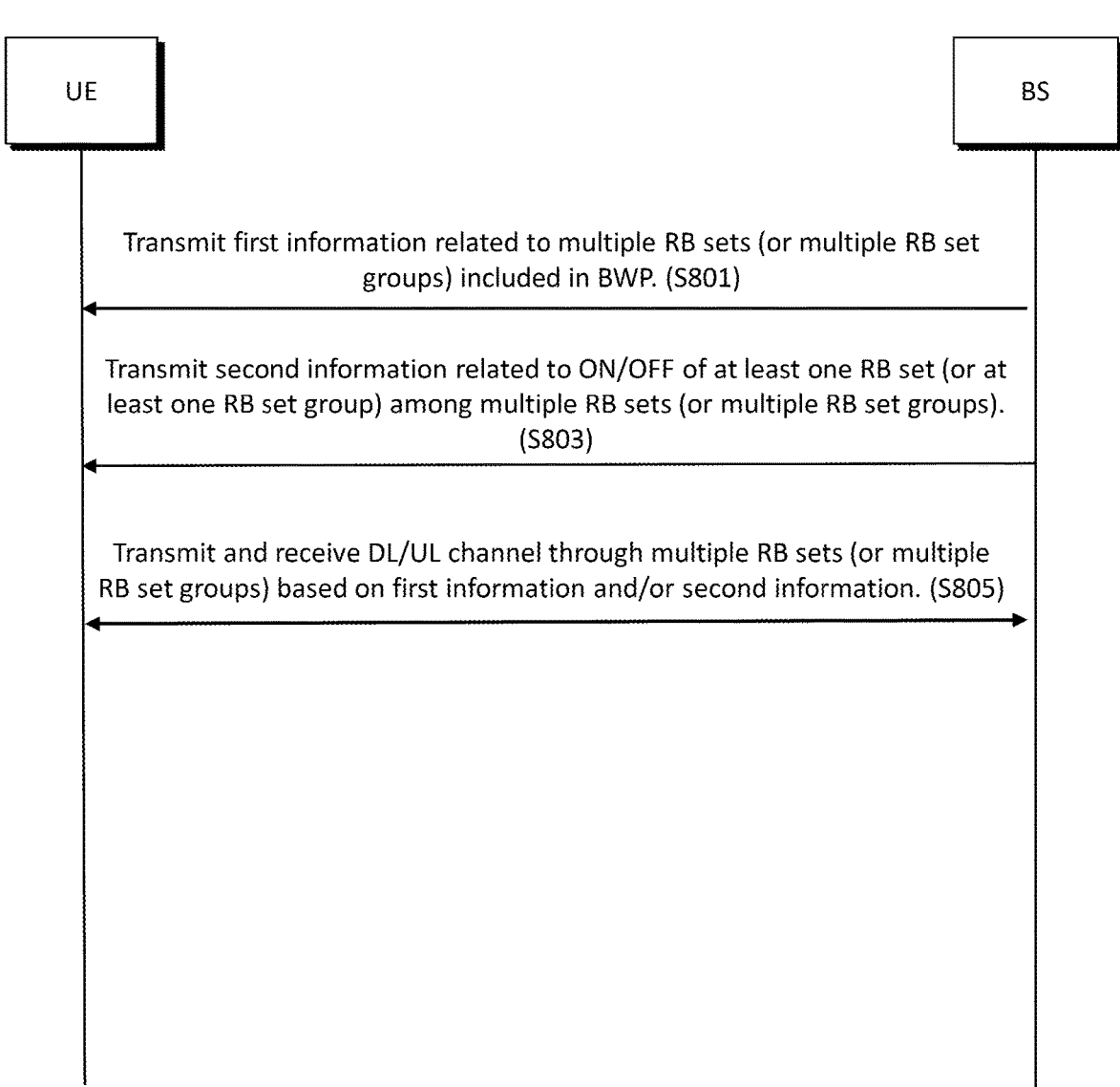

FIGS. 6 to 8 are diagrams for explaining overall operation processes of a UE and a BS according to an embodiment of the present disclosure.

FIG. 6 is a diagram for explaining an operation of the UE according to an embodiment of the present disclosure.

Referring to FIG. 6, the UE may receive first information related to a plurality of RB sets or a plurality of RB set groups included in a BWP (S601). For example, the first information may be received through a radio resource control (RRC) layer, and S601 may be based on [Method #1-1].

The UE may receive second information related to ON/OFF of at least one RB set or at least one RB set group among the plurality of RB sets or the plurality of RB set groups (S603). For example, the second information may be received through DCI or a MAC-CE. Meanwhile, step S603 may be omitted. For example, when the UE operates based on (1) of [Method #1-1], S603 may be omitted.

The UE may transmit and receive a DL/UL channel through the plurality of RB sets or the plurality of RB set groups based on the first information and/or the second information (S605). In this case, step S605 may be based on [Method #1-2]. In addition, when a DL channel received by the UE is a CSI-RS, the UE may receive and measure the CSI-RS based on [Method #2].

FIG. 7 is a diagram for explaining an operation of the BS according to an embodiment of the present disclosure.

Referring to FIG. 7, the BS may transmit first information related to a plurality of RB sets or a plurality of RB set groups included in a BWP (S701). For example, the first information may be transmitted through an RRC layer, and S701 may be based on [Method #1-1].

The BS may transmit second information related to ON/OFF of at least one RB set or at least one RB set group among the plurality of RB sets or the plurality of RB set groups (S703). For example, the second information may be transmitted through DCI or a MAC-CE. Meanwhile, step S703 may be omitted. For example, when the BS operates based on (1) of [Method #1-1], S703 may be omitted.

The BS may transmit and receive a DL/UL channel through the plurality of RB sets or the plurality of RB set groups based on the first information and/or the second information (S705). In this case, step S705 may be based on [Method #1-2]. In addition, when the DL channel transmitted by the BS is a CSI-RS, the BS may transmit the CSI-RS based on [Method #2].

FIG. 8 is a diagram for explaining an operation of a network according to an embodiment of the present disclosure.

Referring to FIG. 8, the BS may transmit first information related to a plurality of RB sets or a plurality of RB set groups included in a BWP to the UE (S801). For example, the first information may be transmitted through an RRC layer, and S801 may be based on [Method #1-1].

The BS may transmit second information related to ON/OFF of at least one RB set or at least one RB set group among the plurality of RB sets or the plurality of RB set groups to the UE (S803). For example, the second information may be transmitted through DCI or a MAC-CE. Meanwhile, S803 may be omitted. For example, when the BS operates based on (1) of [Method #1-1], S803 may be omitted.

The BS and the UE may transmit and receive a DL/UL channel through the plurality of RB sets or the plurality of RB set groups based on the first information and/or the second information (S805). In this case, step S805 may be based on [Method #1-2]. In addition, when the DL channel transmitted by the BS is a CSI-RS, the BS transmits the CSI-RS based on [Method #2], and the UE may receive and measure the CSI-RS based on [Method #2].

[Method #1] A method of dynamically adjusting a frequency resource through an RB set or RB set group and a transmission and reception operation of a DL/UL signal/channel of the BS and the UE 1. Method #1-1

A method of configuring/defining an RB set in a BWP and indicating transmission and reception (TRX) ON/OFF in units of RB sets or RB set groups In this case, the RB set may mean a set of continuous or discontinuous RBs among RBs constituting the BWP. The RB set group may mean a group of continuous or discontinuous RB sets. In addition, indicating TRX ON/OFF in units of RB sets or RB set groups may be ON/OFF of availability during TRX of each RB set or RB set group. For example, when an RB set or RB set group is turned ON, this may mean that TRX through the corresponding RB set or RB set group is available, and when an RB set or RB set group is turned OFF, this may mean that TRX through the corresponding RB set or RB set group is unavailable.

(1) When there are remaining RBs after configuring a plurality of RB sets or a plurality of RB set groups in the BWP, the remaining RBs may be configured as resources always available for TRX or resources always not available for TRX, regardless of an ON/OFF indication of the BS through an RB set or an RB set group, according to prearrangement (e.g., defined in the standard)/preconfiguration.

(2) ON/OFF/not available (NA) may be semi-statically configured for each RB set or each RB set group, and ON or OFF may be dynamically indicated for an RB set or RB set group configured to be NA through (group common) DCI (or a MAC-CE).

In the absence of a separate dynamic indication, related resources may be regarded as unavailable (i.e., OFF).

(3) ON/OFF for each of a plurality of RB sets or a plurality of RB set groups may be dynamically indicated through the (group-common) DCI or the MAC-CE.

(4) ON/OFF patterns of a plurality of RB sets or a plurality of RB set groups may be preconfigured, and a specific ON/OFF pattern may be dynamically indicated through the (group-common) DCI or the MAC-CE.

(5) When one of a plurality of preset timer value candidates is configured for each RB set or each RB set group or a timer value for each RB set or each RB set group is indicated through the DCI or the MAC-CE, the corresponding RB set/RB set group may be turned OFF while a timer is running and then be turned ON when the timer expires.

2. Method #1-2

A TRX operation of a DL/UL signal/channel when a plurality of RB sets or a plurality of RB set groups in the BWP is turned ON/OFF for power savings (1) DL/UL signals and channels available for TRX may be configured for each RB set or RB set group.

(2) Even in an RB set/RB set group that is turned OFF, transmission of some indispensable DL/UL signals/channels may be allowed according to prearrangement (e.g., defined in the standard)/preconfiguration. For example, transmission of an SSB, a periodic CSI-RS, a CSI-RS for tracking, a Type0-PDCCH common search space (CSS) set, a PRACH, and/or a scheduling request (SR) may be allowed even in an RB set/RB set group that is turned OFF.

(3) Transmission in an RB set/RB set group overlapping with an RB in which an indispensable DL/UL signal/channel is transmitted may be allowed regardless of an OFF indication even without prearrangement/preconfiguration. For example, transmission of the SSB, the periodic CSI-RS, the CSI-RS for tracking, the Type0-PDCCH CSS set, the PRACH, and/or the SR may be allowed regardless of an OFF indication of the RB set/RB set group.

(4) According to preconfiguration, PDCCH monitoring may also be turned OFF or a control resource set (CORESET) RB set may always be excluded from being turned OFF regardless of OFF of an RB set.

(5) When PDCCH monitoring is always performed regardless of an OFF indication, the extension of an OFF duration may be indicated or switching to ON may be indicated, before an OFF duration, an OFF timer, or an ON/OFF pattern is ended, according to the indication of the BS.

(6) A CORESET, a CSI-RS, or a DL/UL signal/channel in the BWP may be separately configured according to an ON/OFF indication for an RB set or an RB set group or ON/OFF of power saving mode of the BS.

Although the concept of the BWP has been introduced for efficient resource management and energy savings in NR, a method of saving the power consumption of the BS may be considered by dynamically adjusting the TRX frequency resources with a smaller granularity than the BWP in terms of NES, upon considering the limit on the number of configurable BWPs and BWP switching delay.

As an exemplary method of configuring an RB set and an RB set group, when the size of an RB set is set to P and the number of RB sets is set to N, then N RB sets having a size P from a starting RB of the BWP may be configured. In addition, a plurality of RB sets may be configured as an RB set group. Furthermore, remaining RBs after configuring a plurality of RB sets in the BWP may be configured as resources always available for TRX or resources always not available for TRX, regardless of an ON/OFF indication of the BS, according to prearrangement (e.g., defined in the standard)/preconfiguration.

For example, when 10 RBs are configured as one RB set each having 4 RBs as illustrated in (a) of FIG. 9, 8 RBs are categorized into 2 RB sets and the remaining 2 RBs may be configured as resources always available or not available for TRX regardless of the ON/OFF indication of the BS. On the other hand, the configuration as illustrated in (a) of FIG. 9 may be performed through an RRC layer.

For NES, ON/OFF/NA may be semi-statically configured for each RB set/RB set group. Here, ON may mean an RB set/RB set group that is always turned ON, and OFF may mean an RB set/RB set group that is always turned OFF.

Meanwhile, ON or OFF of an RB set/RB set group configured to be NA may be dynamically determined through DCI or a MAC-CE. In this case, when there is no separate dynamic indication for the RB set/RB set group configured to be NA, the RB set/RB set group may be regarded as unavailable (i.e., OFF) and may not be used.

For example, referring to (b) of FIG. 9, ON/OFF/NA of each of 10 RBs or each of 5 RB sets may be semi-statically configured, and ON/OFF of RB set #3 and RB set #5 that are configured to be NA may be dynamically determined through the DCI or the MAC-CE. Here, semi-static configuration may mean that ON/OFF/NA is configured through the RRC layer.

The BS may operate by configuring the RB set/RB set group to be ON/OFF/NA as needed or dynamically indicate ON/OFF through the (group-common) DCI or the MAC-CE for all RB sets/RB set groups without separate semi-static configuration. For example, as illustrated in (c) or (d) of FIG. 9, whether each of 10 RBs or each of 5 RB sets is turned ON/OFF may be configured through the (group-common) DCI or the MAC-CE.

For example, as illustrated in (d) of FIG. 9, when a symbol in which 10 RBs are configured is configured as a flexible symbol through a slot format indicator (SFI) and DL is indicated for the symbol, the UE may receive a DL signal through RB sets #1 and #2, which are reception (RX)-ON, and disregard RB sets #3 and #4, which are RX-OFF.

As another method, ON/OFF patterns of a plurality of RB sets/RB set groups may be preconfigured, and a specific pattern may be dynamically indicated through the (group-common) DCI or the MAC-CE.

For example, referring to FIG. 10, when a plurality of patterns such as {Pattern #1: always ON, Pattern #2: ON of one slot/OFF of two slots, pattern #3: ON of two slots/OFF of one slot} is preconfigured as ON/OFF pattern candidates for a specific RB set (e.g., RB set #1) through RRC signaling, and one of the candidate patterns is indicated through the (group-common) DCI or the MAC-CE, a DL/UL signal/channel may be transmitted and received according to the corresponding ON/OFF pattern.

As another example, as illustrated in (c) and (d) of FIG. 9, ON/OFF patterns for a plurality of RB sets/RB set groups in one or more symbols are preconfigured, and a specific pattern may be indicated through the (group-common) DCI or MAC-CE.

For example, when two ON/OFF patterns as illustrated in (c) and (d) of FIG. 9 are configured through the RRC layer, and one of the two patterns is indicated through the (group-common) DCI or the MAC-CE, the UE may transmit and receive the DL/UL signal/channel in one or more symbols according to the corresponding pattern. In this case, the number of symbols to which the corresponding pattern is to be applied may also be indicated.

In addition, one of a plurality of preset candidate timer values may be configured for each RB set or each RB set group. Alternatively, when one timer value among a plurality of timer values preset for each RB set or RB set group is indicated through the (group-common) DCI or the MAC-CE, a TRX operation of the DL/UL signal may be performed by turning OFF the corresponding RB set/RB set group while the timer is running and then turning ON the corresponding RB set/RB set group when the timer expires. For example, as illustrated in (c) of FIG. 9, when ON/OFF is indicated for each RB set, the timer of RB set #2 corresponds to 2 symbols, and the timer of RB set #3 corresponds to 5 symbols, RB set #2 may be turned OFF for 2 symbols and turned ON again to transmit and receive the DL/UL signal, and RB set #3 may be turned OFF for 5 symbols and turned ON again to transmit and receive the DL/UL signal. Then, RB set #3 may be turned OFF longer for 3 symbols than RB set #2.

In this case, when OFF of an RB set/RB set group is indicated (e.g., using a timer and/or a pattern) through the (group-common) DCI or the MAC-CE, an ON/OFF application time point of a resource actually indicated as ON/OFF from a time point at which the corresponding indication is received may be prearranged (e.g., defined in the standard)/preconfigured or an application time point of the corresponding indication may be dynamically indicated through the (group-common) DCI or the MAC-CE together with the indication. When the application time point is preconfigured or prearranged, the application time point may be configured or indicated as, for example, the same timeline as K1. In other words, considering a processing time of the UE, the corresponding indication may be applied K1 symbols or slots after from the time point at which the (group-common) DCI or the MAC-CE is received or may be applied starting from the next slot of a slot including a symbol after the K1 symbols.

As described above, when the RB set or RB set group in the BWP is turned ON/OFF for energy savings of the BS, the TRX operation of the DL/UL signal/channel according to ON/OFF of the RB set/RB set group needs to be defined.

For example, the BS may preconfigure DL/UL signals and channels available for TRX of each RB set or each RB set group. For example, a broadcast channel such as an SSB/SIB may be configured to be transmitted in a specific RB set, and only a dynamically transmitted PDSCH/PUSCH may be configured to be transmitted in the specific RB set.

However, even when OFF is indicated for each RB set or a pattern or timer is applied to each RB set, it may be desirable to allow an indispensable DL/UL signal such as an SSB or a PRACH to be transmitted/received regardless of the OFF indication. Therefore, transmission of some indispensable DL/UL signals/channels may be permitted even in an RB set/RB set group that is turned OFF, according to prearrangement (e.g., defined in the standard)/preconfiguration. For example, transmission of all of an SSB, a periodic CSI-RS, a Type0-PDCCH CSS set, a PRACH, an SR, and a cell-specific signal may be allowed regardless of whether the RB set is turned OFF.

Alternatively, transmission in an RB set/RB set group overlapping with an RB in which an indispensable DL/UL signal/channel, such as the SSB, the periodic CSI-RS, the Type0-PDCCH CSS set, the PRACH, or the SR, is transmitted may be allowed regardless of the OFF indication even without prearrangement/preconfiguration. In this case, transmission of only the indispensable DL/UL signal/channel may be allowed in the corresponding RB set/RB set group, and transmission of DL/UL signals/channels other than the indispensable DL/UL signal/channel may be allowed in RBs other than an RB allocated for the indispensable DL/UL signal/channel although the RBs are included in the RB set/RB set group.

When an RB set/RB set group including a specific CORE-SET/search space set is configured to be always turned ON regardless of the OFF indication, and thus PDCCH monitoring continues, extension of an OFF duration or switching to ON may be indicated for some or all of a plurality of RB sets/RB set groups through the corresponding specific CORESET/search space set before an OFF duration/timer/pattern is ended, according to the indication of the BS.

As another considered method, PDCCH monitoring may also be turned OFF according to preconfiguration or a CORESET RB set may always be excluded from being turned OFF regardless of OFF of the RB set. In this case, if there is a resource overlapping with an RB set that is turned OFF among specific PDCCH candidates, the UE may not be requested to perform PDCCH decoding/detection through a corresponding PDCCH candidate.

Alternatively, a CORESET/CSI-RS/DL or UL signal/channel in a BWP may be independently configured according to an ON/OFF indication for an RB set or an RB set group or ON/OFF of the power saving mode of the BS, rather than configuring a specific CORESET to be always an exception of the OFF indication.

For example, in the case of a CSI-RS, when the corresponding CSI-RS is used to acquire a channel quality indicator (CQI) and some or all of frequency resources to which the corresponding CSI-RS is allocated overlap with an RB set that is turned OFF, CSI measurement may not be performed through the CSI-RS.

In addition, the UE may perform CSI measurement in an area that does not overlap with an RB set that is turned OFF, and CSI reporting may be performed in the same way as existing reporting. For example, CSI information corresponding to an RB set on which measurement is not performed may not be updated and may be reported in CSI.

Alternatively, the UE may perform CSI measurement in an area that does not overlap with an RB set that is turned OFF and report CSI including only some CSI information corresponding to the measured CSI. For example, CSI information corresponding to an RB set on which measurement is not performed may be omitted from the corresponding CSI.

In the case of a CSI-RS for mobility, the above CSI measurement may be replaced with radio resource management (RRM) measurement and applied. That is, when the CSI-RS overlaps with an RB set that is turned OFF, RRM measurement may not be performed through the corresponding CSI-RS, or RRM measurement may be performed in an area that does not overlap with the RB set that is turned OFF.

For example, in the case of a CORESET, a CORESET having a specific bandwidth may be used for an active BWP when the BS is not in the power saving mode. On the other hand, when the BS operates in the power saving mode, the CORESET may be automatically changed to a CORESET configuration confined in a specific RB set and used. For example, the CORESET may be automatically changed to monitor a PDCCH through a CORESET included in an RB set configured to be turned ON. As another example, the bandwidth of a CORESET when the BS is not in the power saving mode may be wider than the bandwidth of a CORESET when the BS is in the power saving mode. In other words, when the BS is not in the power saving mode, a CORESET of a relatively wide bandwidth is used, and when the BS operates in the power saving mode, the CORESET may be automatically changed to a CORESET of a relatively narrow bandwidth. In this case, for example, the PDCCH may be monitored through a CORESET used according to the power saving mode regardless of ON/OFF of an RB set/RB set group in which the corresponding CORESET is included.

Meanwhile, in [Method #1], the BS needs to preconfigure an RB set or an RB set group in a BWP, for power savings, by adjusting resources in the frequency domain through dynamic ON/OFF of an RB set or RB set group in a DL BWP and/or a UL BWP. For example, as a method of configuring the RB set or RB set group, N specific contiguous RBs may be defined as one resource block group (RBG), and X RBGs may be defined as an RB set, similar to a resource allocation method in the frequency domain. In this case, the number of RBs constituting an RBG may vary according to the size of a BWP similar to (or reusing) allocation type 0, and an RBG index and a PRB index may be predefined/prearranged (in a standard specification). Alternatively, a combination of a starting RB and the number of continuous RBs may be preconfigured/prearranged as a specific value through a resource indicator value (RIV), and when the corresponding value is indicated, specific RB bundles may be defined as one RB set by a formula similar to (or reusing) allocation type 1. In addition, an RB set group may be defined by grouping one or more RB sets into groups.

In addition, in the case of a DL/UL signal/channel configured through RRC, TRX of the DL/UL signal/channel may not be performed when a specific RB set or RB set group including a frequency resource of the corresponding DL/UL signal/channel in a BWP is indicated as OFF by the BS or when a deactivated resource in the frequency domain and the frequency resource of the corresponding DL/UL signal/channel overlap. Alternatively, in the case of the DL/UL signal/channel configured through RRC, TRX of the DL/UL signal/channel may not be performed when a (specific) RB set or RB set group is turned OFF according to preconfiguration/prearrangement. For example, the DL/UL signal/channel configured through RRC may be a PDCCH, a PDSCH, a CSI-RS, a positioning reference signal (PRS), a PUCCH, a PUSCH, a configured grant (CG)-PUSCH, or an SRS, configured to be semi-persistently/periodically repeatedly transmitted/received.

According to [Method #1], the BWP is divided into a plurality of RB sets/RB set groups, and each RB set/RB set group is semi-statically or dynamically turned ON/OFF, thereby reducing power consumption allocated to frequency resources of the BS and the UE.

[Method #2] A method of differently using a CSI-RS configuration for RRM measurement in a BWP according to a power saving mode of the BS 1. Method #2-1

When the power saving mode is turned ON for NES (i.e., when the BS operates in an NES mode), a CSI-RS configuration for RRM may not be restricted even in an active BWP.

2. Method #2-2

When the BS operates in the NES mode, it is not expected that the CSI-RS for RRM measurement will be configured in a BWP except for an active BWP, or even when the CSI-RS for RRM measurement is configured, RRM measurement may not be performed in a BWP outside the active BWP.

In LTE, an always-ON signal such as a common reference signal (CRS) is present and has been used for time and frequency synchronization or neighbor cell detection. However, in NR, there is no always-ON reference signal based on high configurability. In NR, however, a CSI-RS may be used for a purpose similar to the CRS in LTE according to configuration.

In addition, the CSI-RS may be configured and used for various purposes such as CSI determination, beam management, time-frequency tracking, and mobility. In particular, the CSI-RS may be configured as a resource for RRM measurement for mobility management.

The CSI-RS resource for RRM measurement may originally be configured only in the active BWP in the case of a connected mode. However, when the BS operates in the power saving mode, CSI-RS resource configuration for RRM measurement may be limited even in the active BWP.

For example, the CSI-RS may not be configured for a specific time period or in a specific frequency band in which the BS operates in the power saving mode. For example, in [Method #1], the CSI-RS may not be configured in an RB set/RB set group set which is configured to be turned OFF for a certain time period by the BS.

Alternatively, when it is confirmed that the BS operates in the power saving mode, the UE does not expect that the CSI-RS for RRM measurement will be configured in a frequency band other than the active BWP, or even when the CSI-RS is configured, the UE may not perform RRM measurement in a frequency band outside the active BWP. Meanwhile, the UE may confirm that the BS operates in the power saving mode, for example, through signaling such as an SIB/RRC/DCI.

According to [Method #2], unnecessary measurement may be reduced and power consumption of the BS for CSI-RS transmission may be reduced, by preventing CSI and/or RRM measurement on frequency resources that are not used for a certain time period, such as an inactive BWP or an RB set/RB set group that is turned OFF.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 11:
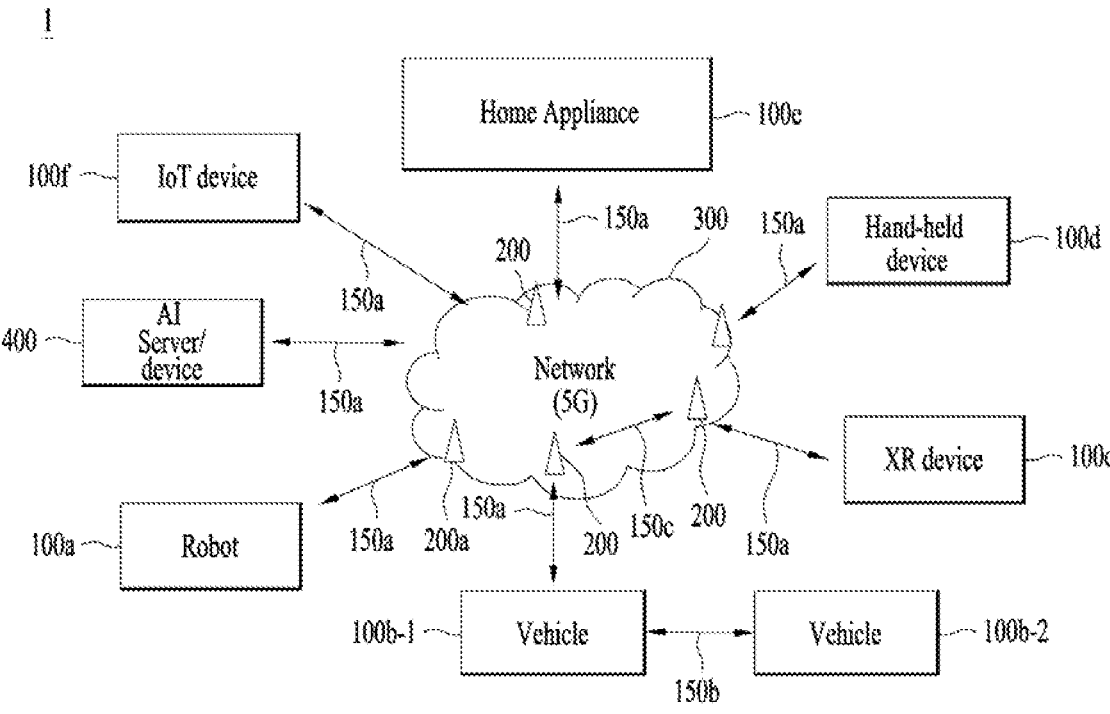
FIG. 11 illustrates an exemplary communication system applied to the present disclosure.

FIG. 11 illustrates a communication system 1 applied to the present disclosure.

Referring to FIG. 11, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 12:
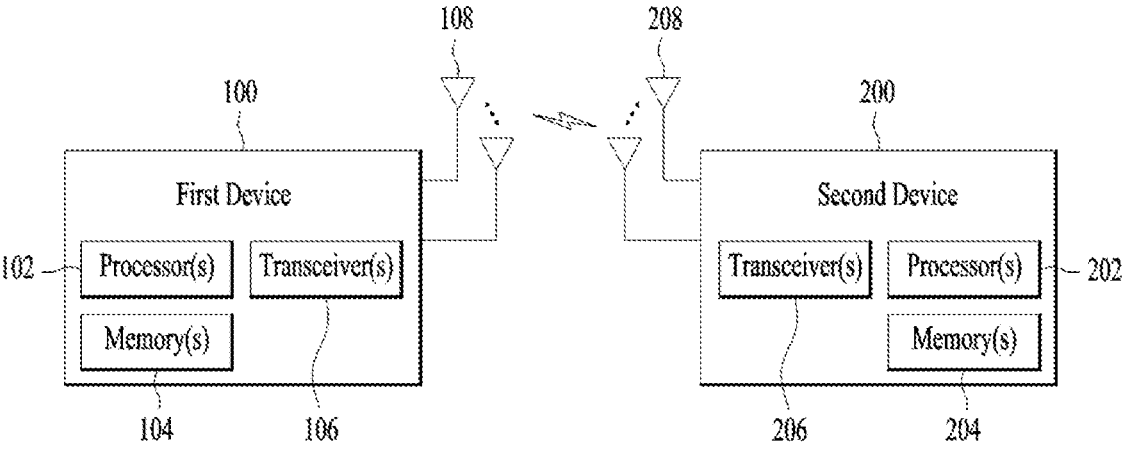
FIG. 12 illustrates an exemplary wireless device applicable to the present disclosure.

FIG. 12 illustrates wireless devices applicable to the present disclosure.

Referring to FIG. 12, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 102 may receive first information related to a plurality of RB sets or a plurality of RB set groups included in a BWP through the transceiver 106. For example, the first information may be received through an RRC layer, and the processor 102 may receive the first information in S601 based on [Method #1-1].

The processor 102 may receive second information related to ON/OFF of at least one RB set or at least one RB set group among the plurality of RB sets or the plurality of RB set groups through the transceiver 106. For example, the second information may be received through DCI or a MAC-CE. Meanwhile, receiving the second information by the processor 102 may be omitted. For example, when the processor 102 operates based on (1) of [Method #1-1], reception of the second information may be omitted.

The processor 102 may transmit and receive a DL/UL channel through the transceiver 106 through the plurality of RB sets or the plurality of RB set groups based on the first information and/or the second information. In this case, TRX of the DL/UL channel by the processor 102 may be based on [Method #1-2]. In addition, when the DL channel received by the processor 102 is a CSI-RS, the processor 102 may receive and measure the CSI-RS based on [Method #2].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 202 may transmit, through the transceiver 206, first information related to a plurality of RB sets or a plurality of RB set groups included in a BWP. For example, the first information may be transmitted through an RRC layer and the processor 202 may transmit the first information based on [Method #1-1].

The processor 202 may transmit, through the transceiver 206, second information related to ON/OFF of at least one RB set or at least one RB set group among the plurality of RB sets or the plurality of RB set groups. For example, the second information may be transmitted through DCI or a MAC-CE. Meanwhile, transmission of the second information by the processor 202 may be omitted. For example, when the processor 202 operates based on (1) of [Method #1-1], transmission of the second information by the processor 202 may be omitted.

The processor 202 may transmit and receive, through the transceiver 206, a DL/UL channel through the plurality of RB sets or the plurality of RB set groups based on the first information and/or the second information. In this case, TRX of the DL/UL channel by the processor 202 may be based on [Method #1-2]. When the DL channel transmitted by the processor 202 is a CSI-RS, the processor 202 may transmit the CSI-RS based on [Method #2].

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 13:
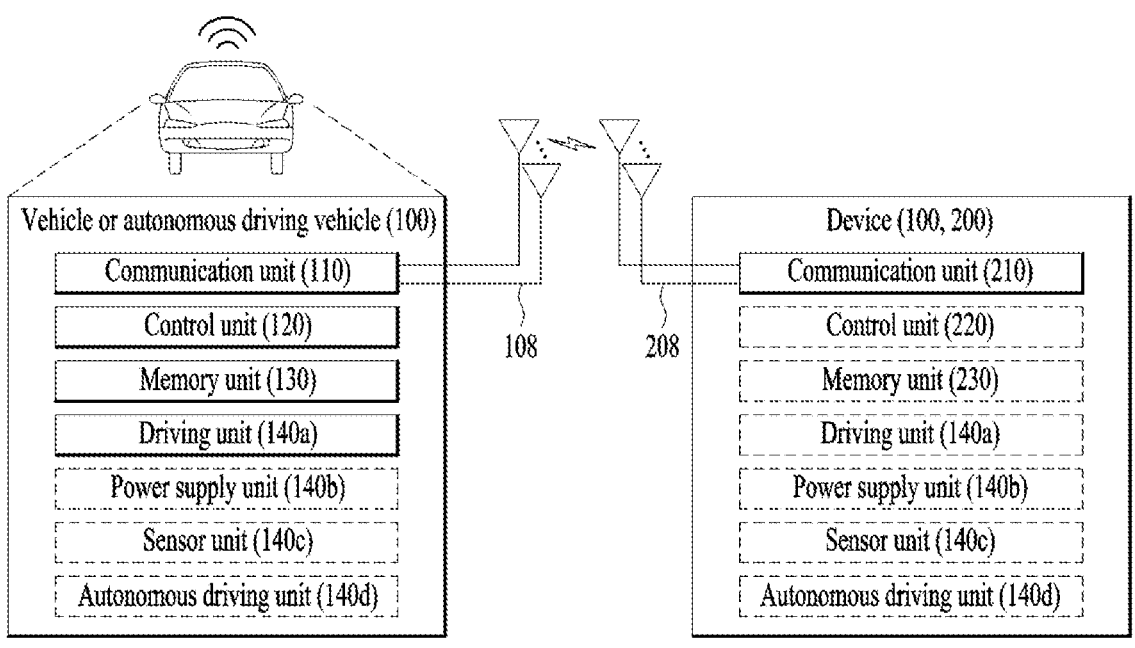
FIG. 13 illustrates an exemplary vehicle or autonomous driving vehicle applicable to the present disclosure.

FIG. 13 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 13, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the method and apparatus for transmitting and receiving a UL signal or a DL signal have been described above in the context of being applied to a 5G NewRAT system, they are also applicable to various wireless communication system as well as the 5G NewRAT system.

The invention claimed is:

1. A method performed by a user equipment (UE), the method comprising:
   receiving first information related to a bandwidth part (BWP) for a carrier, wherein the BWP includes a plurality of resource block (RB) sets;
   receiving second information related to an available RB set among the plurality of RB sets included in the BWP;
   performing physical downlink control channel (PDCCH) monitoring through a control resource set (CORESET) included within the available RB set; and
   receiving a physical downlink shared channel (PDSCH) based on a detection of a PDCCH that schedules the PDSCH.

2. The method of claim 1, wherein the second information is related to whether each of the plurality of RB sets is available.

3. The method of claim 1, wherein each of the plurality of RB sets is configured as one of available, not available, and unknown, and
   wherein the second information is related to whether an RB set configured as unknown is available.

4. The method of claim 1, wherein the available RB set is available during a timer duration known by the second information.

5. The method of claim 1, wherein the second information is related to a pattern regarding a slot that the available RB set is available.

6. The method of claim 1, wherein the PDCCH monitoring is not performed within an RB set which is not available based on the second information.

7. The method of claim 1, wherein downlink channel receptions or uplink channel transmissions are not allowed within an RB set which is not available based on the second information.

8. The method of claim 1, further comprising:
   performing channel state information (CSI) measurements based on a CSI reference signal (CSI-RS) resource included in the available RB set.

9. The method of claim 8, wherein a CSI-RS resource overlapping with an RB set which is not available based on the second information is not used for the CSI measurements.

10. A user equipment (UE) comprising:
    at least one transceiver;
    at least one processor; and
    at least one memory operably connected to the at least one processor and configured to store instructions that, when executed, cause the at least one processor to perform operations comprising:
    receiving, through the at least one transceiver, first information related to a bandwidth part (BWP) for a carrier, wherein the BWP includes a plurality of resource block (RB) sets;
    receiving, through the at least one transceiver, second information related to an available RB set among the plurality of RB sets included in the BWP;
    performing physical downlink control channel (PDCCH) monitoring through a control resource set (CORESET) included within the available RB set; and
    receiving a physical downlink shared channel (PDSCH) based on a detection of a PDCCH that schedules the PDSCH.

11. The UE of claim 10, wherein the second information is related to whether each of the plurality of RB sets is available.

12. The UE of claim 10, wherein each of the plurality of RB sets is configured as one of available, not available, and unknown, and wherein the second information is related to whether an RB set configured as unknown is available.

13. The UE of claim 10, wherein the available RB set is available during a timer duration known by the second information.

14. The UE of claim 10, wherein the second information is related to a pattern regarding a slot that the available RB set is available.

15. The UE of claim 10, wherein the PDCCH monitoring is not performed within an RB set which is not available based on the second information.

16. The UE of claim 10, wherein downlink channel receptions or uplink channel transmissions are not allowed within an RB set which is not available based on the second information.

17. The UE of claim 10, wherein the operations further comprise:

performing channel state information (CSI) measurements based on a CSI reference signal (CSI-RS) resource included in the available RB set.

18. The UE of claim 17, wherein a CSI-RS resource overlapping with an RB set which is not available based on the second information is not used for the CSI measurements.

19. A base station (BS) comprising:

at least one transceiver;

at least one processor; and at least one memory operably connected to the at least one processor and configured to store instructions that, when executed, cause the at least one processor to perform operations comprising:

transmitting, through the at least one transceiver, first information related to a bandwidth part (BWP) for a carrier, wherein the BWP includes a plurality of resource block (RB) sets;

transmitting, through the at least one transceiver, second information related to an available resource block (RB) set among the plurality of RB sets included in the BWP;

performing physical downlink control channel (PDCCH) transmissions through a control resource set (CORESET) included within the available RB set; and receiving a physical downlink shared channel (PDSCH) based on a detection of a PDCCH that schedules the PDSCH.

20. The BS of claim 19, wherein the PDCCH transmissions are not performed within an RB set which is not available based on the second information.

* * * * *